United States Patent
Sako et al.

[11] Patent Number: 5,877,834
[45] Date of Patent: Mar. 2, 1999

[54] SMECTIC LIQUID CRYSTAL ELEMENT UTILIZING SPONTANEOUS POLARIZATION OF LIQUID CRYSTAL MOLECULES AND POLYMER, AND MANUFACTURING METHOD THEREOF

[75] Inventors: Teiyu Sako; Aya Miyazaki, both of Kashiwa; Akira Sakaigawa, Kawasaki; Mitsuhiro Koden, Kashiwa, all of Japan

[73] Assignees: Sharp Kabushiki Kaisha, Osaka, Japan; The Secretary of State for Defence in Her Britannic Majesty's Government of the United Kingdom of Great Britain and Northern Ireland, The Defence Evaluation and Research Agency, Hants, United Kingdom

[21] Appl. No.: 821,463

[22] Filed: Mar. 21, 1997

[30] Foreign Application Priority Data

May 24, 1996 [JP] Japan .................................. 8-130171

[51] Int. Cl.$^6$ .................................................. C09K 19/02
[52] U.S. Cl. .......................... 349/171; 349/172; 349/184
[58] Field of Search ..................................... 349/171, 172, 349/184

[56] References Cited

U.S. PATENT DOCUMENTS

| | | | |
|---|---|---|---|
| 4,715,688 | 12/1987 | Harada et al. | 350/350 |
| 4,818,807 | 4/1989 | Morita et al. | 528/191 |
| 5,109,294 | 4/1992 | Hanyu et al. | 349/58 |
| 5,258,134 | 11/1993 | Yoshinaga et al. | 252/299.01 |
| 5,384,069 | 1/1995 | Yoshinaga et al. | |
| 5,504,600 | 4/1996 | Pirs et al. | 349/171 |
| 5,598,284 | 1/1997 | Kogushi et al. | 349/172 |
| 5,716,679 | 2/1998 | Krug et al. | 427/515 |

FOREIGN PATENT DOCUMENTS

| | | |
|---|---|---|
| 0295106 | 12/1988 | European Pat. Off. . |
| 0412485 | 2/1991 | European Pat. Off. . |
| 0782032 | 7/1997 | European Pat. Off. . |
| 6194635 | 7/1994 | Japan . |

OTHER PUBLICATIONS

R.A.M. Hikmet et al., Liquid Crystals, 1995, vol. 19, No. 1, pp. 65–76, "Ferroelectric Liquid Crystal gels Network Stabilized Ferroelectric Displays".

"Properties and Applications of Ferroelectric Liquid Crystals"; J. Patel et al.; Optical Engineering; vol. 26, No. 5, May 1, 1987; pp. 373–384.

*Primary Examiner*—William L. Sikes
*Assistant Examiner*—Tarifur R. Chowdhury

[57] ABSTRACT

A polymer having spontaneous polarization with the same codes as liquid crystal is introduced into a liquid crystal layer of the smectic liquid crystal cell so that the responding speed is improved (second liquid crystal cell). In another way, a polymer having spontaneous polarization with opposite codes to the liquid crystal is introduced into liquid crystal showing $\tau-V_{min}$ characteristic so that a driving voltage is lowered (first liquid crystal cell). These polymers are previously added to a liquid crystal composite before injecting into the liquid crystal cell. In another way, after a photochemically polymeric monomer is added to the liquid crystal composite and the obtained product is injected into the liquid crystal cell, the monomer is polymerized by the projection of a light. Furthermore, the liquid crystal cell into which the polymer is introduced is heated again so as to show I phase and is cooled so that the tone display is realized.

26 Claims, 13 Drawing Sheets

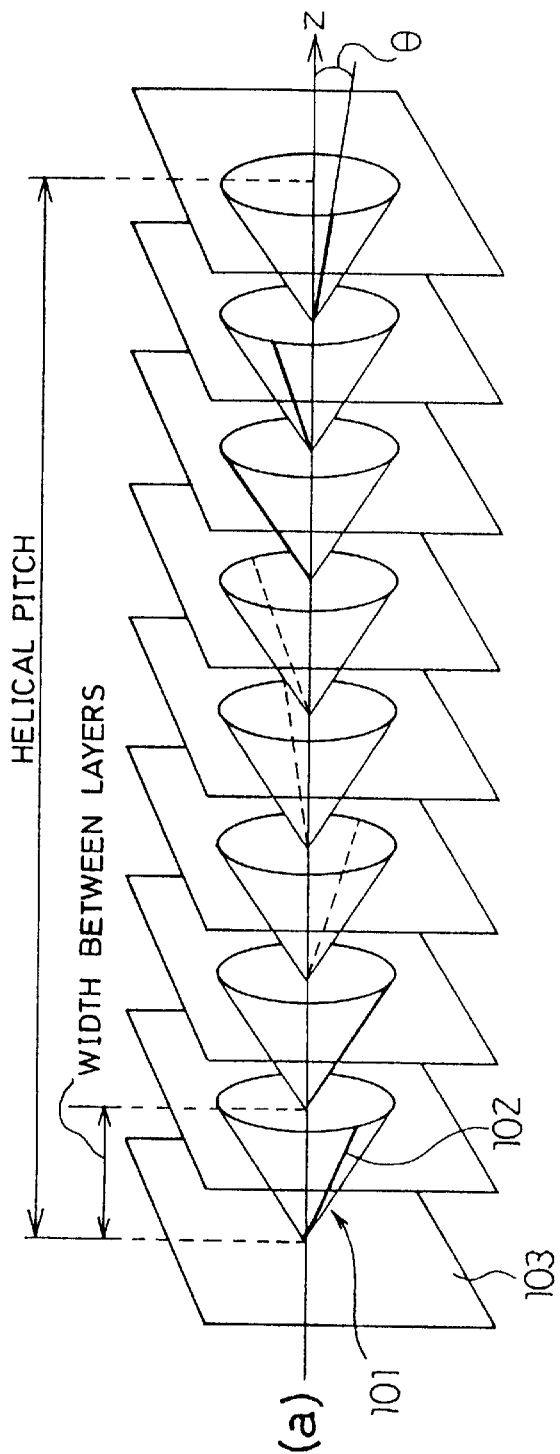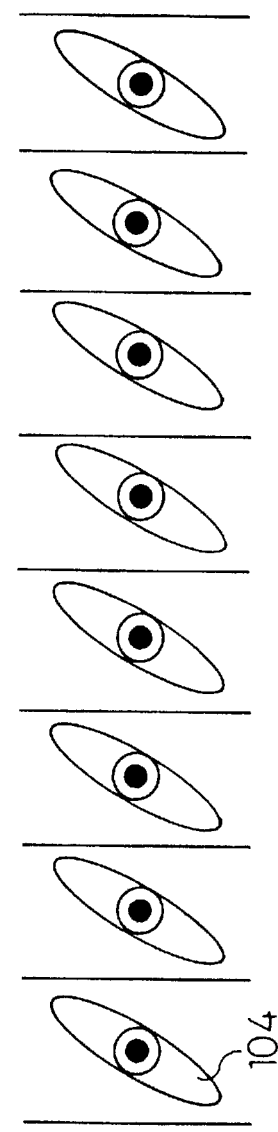
FIG. 12 (a)
FIG. 12 (b)

SMECTIC LIQUID CRYSTAL ELEMENT UTILIZING SPONTANEOUS POLARIZATION OF LIQUID CRYSTAL MOLECULES AND POLYMER, AND MANUFACTURING METHOD THEREOF

FIELD OF THE INVENTION

The present invention relates to a smectic liquid crystal element which is applied to a flat panel display, etc., more specifically, a smectic liquid crystal element which is capable of tone display and relates to a manufacturing method thereof.

BACKGROUND OF THE INVENTION

Conventionally, TN (Twisted Nematic)-type and STN (Super-Twisted Nematic)-type liquid crystal display elements which use Nematic liquid crystal are known. However, in these liquid crystal display elements, since a responding speed of an electro-optical effect is slow, namely, ms order, when high-speed driving is tried to be executed, disorder of an image occurs, and contrast is lowered. For this reason, these conventional liquid crystal display elements have a limit in a capacity of display, so there arises a problem that they are not suitable for displaying a dynamic image. Therefore, in recent years, as a next-generation liquid crystal display -element, a practical application of a liquid crystal display element using ferroelectric or antiferroelectric liquid crystal is being examined.

In 1975, R. B. Meyer and the others have predicted that if optically active molecules have a dipole moment in a direction which is perpendicular to a molecular major axis, liquid crystal shows ferroelectricity in a chiral smectic C phase (SmC* phase), and have synthesized DOBAMBC (2-methylbutyl p- [p-(decyloxybenzylidene) -amino]-chinnamate), and first succeeded in confirming ferroelectricity in liquid crystal (see R. B. Meyer, L. Liebert, L. Strzelecki and P. Keller: J. Phys. (Paris) 36 (1975) L69).

The following describes a structure of the SmC* phase which shows ferroelectricity as one example of the smectic liquid crystal phase. In the SmC* phase, a position of the center of gravity of the liquid crystal molecules in a layer is disorder, but as shown by a cone 101 in FIG. 12(a), a major axis of the liquid crystal molecules (director 102) is tilted only by a constant angle θ with respect to a layer normal line z which is a normal line of a layer surface 103 dividing a smectic layer. The tilting direction of the director 102 slightly shifts from a layer to a layer, and as a result, alignment of the liquid crystal molecules has a helical structure. A helical pitch is about 1 μm, so it is much larger than a layer intervals of about 1 nm.

A phase having such a molecular arrangement is confirmed not only in ferroelectric liquid crystal but also in antiferroelectric liquid crystal (see A. D. L. Chandani, T. Hagiwara, Y. Suzuki, Y. Ouchi, H. Takezoe and A. Fukuda: Jpn. J. Appl. Phys. 27(1988) L729.). In some antiferroelectric liquid crystal, when optical purity is changed, SmC* phase appears, and in some R-configuration or S-configuration whose optical purity is 100% such as MHPOBC (4-(1-methylheptyloxycarbonyl)phenyl 4'-octyloxybiphenyl-4-carboxylate), the SmC* phase appears.

Clark and Lagerwall discovered that when a cell thickness became not more than about 1 μm (equivalent to the helical pitch), the helical structure disappeared, and as shown in FIG. 12(b), molecules 104 on each layer were in either of bi-stable states according to an electric field to be applied, and suggested a surface stabilized ferroelectric liquid crystal display element (SSFLC). The SSFLC is disclosed in Japanese Unexamined Patent Publication No. 56-107216/1981 (Tokukaisho 56-107216), U.S. Pat. No. 4367924, etc. In FIG. 12(b), a direction of an electric field applied to the molecules 104 is a direction which is perpendicular to a paper surface and is directed from the back side of paper to the front side. All the electric dipole moments of the molecules 104 are arranged in the direction of the electric field as shown in each molecule in FIG. 12(b).

The following describes an operating principle on reference to FIG. 13. As mentioned above, the molecules 104 of SSFLC which are formed as thin cells, as shown in FIG. 13, are brought into one of two stabilized state, i.e. states A and B according to the direction of an electric field to be applied. In the state A shown in the drawing, the direction of the electric field applied to the molecules 104 is perpendicular to the paper surface in the drawing and is directed from the front side of the paper to the back side. In the state B, the direction of the electric field is perpendicular to the paper surface and is directed from the back side of the paper to the front side.

For this reason, by positioning a SSFLC cell between two polarizers which perpendicularly cross each other so that a molecular major axis in the state B is parallel with a direction of one of the polarizers (direction 111 shown by an arrow in the drawing), in the state A, a light is transmitted so that a bright state is obtained, and in the state B, a light is blocked so that a deep state is obtained. Namely, a black-and-white display can be executed by switching the direction of the applied electric field.

In SSFLC, since the spontaneous polarization and the electric field interact with each other, and thus driving torque occurs, the high speed response of μs order to the electric field is possible unlike switching by means of dielectric anisotropy in the normal Nematic liquid crystal. Moreover, when the SSFLC is once switched to one of the bi-stable states, even if the electric field disappears, the SSFLC has a so-called memory characteristic that keeps the state. Therefore, it is not always necessary that a voltage is applied thereto.

As mentioned above, in the SSFLC-type liquid crystal display element, display contents can be written at a high speed per one scanning line by utilizing the high-speed response and the memory characteristic. As a result, a simple-matrix driven display having a large capacity can be realized, and the application of this display to a wall-hanging-type TV is expected.

The liquid crystal element using ferroelectric liquid crystal can strictly realize only two-tone display i.e. bright and deep display due to bi-stability of liquid crystal molecules in the SmC* phase, but an arrangement that makes the tone display possible in a certain degree by utilizing high-speed modulation of electric field to be applied and dot matrix method is suggested. However, such conventional arrangements require a complicated arrangement of a driving system and a complicated panel manufacturing process, thereby increasing the manufacturing cost, etc.

In addition, for example, Japanese Unexamined Patent Publication No. 6-194635/1994 (Tokukaisho 6-194635) discloses a technique for forming a structure obtained by adding non-reactant chiral liquid crystal molecules into a three-dimensional anisotropic network structure composed of a polymer. This makes it possible to stabilize minute adjacent domains having opposite polarization directions to each other by means of the network structure and maintain a half tone even when an electric field does not exist.

However, the technique disclosed in Japanese Unexamined Patent Publication No. 6-194635/1994 (Tokukaisho 6-194635) has a disadvantage that a domain size is not uniform and thus areas of the domains cannot be kept constant at the time of applying a voltage. Since the domain size is considerably larger than an actual pixel size (about 0.3 by 0.3 mm square), it is practically difficult to execute tone display using this technique.

In addition, when a quantity of chiral material to be added to a liquid crystal material as a host is increased, alignment of liquid crystal becomes worse, and the display quality is deteriorated.

In addition, it is a serious problem which should be solved to the ferroelectric liquid crystal display element to improve shock resistance. Namely, the SSFLC-type liquid crystal display element is easily affected by a pressure from outside and an electrical shock, and thus the alignment is easily disordered. On the contrary, a ÷thod of forming a spacer wall to a substrate has been suggested, but this method causes various problems in the panel manufacturing process, so this method has not been put into practical use.

Furthermore, the ferroelectric liquid crystal element is capable of high-speed driving more easily than TN-type liquid crystal element, etc. However, in order to make it possible to apply the ferroelectric liquid crystal element to a flat panel display with a wide screen such as a wall-hanging-type TV, higher responding speed is desired. Moreover, it is preferable to suppress a driving voltage lower in order to decrease power consumption and suppress a calorific value.

SUMMARY OF THE INVENTION

It is an object of the present invention to provide a smectic liquid crystal element using smectic liquid crystal such as ferroelectric liquid crystal, which is capable of improving the responding speed and the power consumption and realizing the tone display as well as improving the shock resistance.

In order to achieve the above object, a first smectic liquid crystal element of the present invention having a liquid crystal layer showing a smectic phase between a pair of substrates having electrodes, is characterized in that:

a polymer, which induces spontaneous polarization when a molecular arrangement of the liquid crystal layer is biaxial, is introduced into the liquid crystal layer, in the smectic phase, the spontaneous polarization of the polymer and the spontaneous polarization of the liquid crystal molecular of the liquid crystal layer have the same codes.

In accordance with the above arrangement, the strength of the spontaneous polarization of the whole liquid crystal layer is increased in the smectic phase by introducing the polymer having spontaneous polarization with the same code as the spontaneous polarization of the liquid crystal molecules into a liquid crystal layer. For this reason, when the driving electric field is applied from the electrode, a driving force, which is applied to the liquid crystal molecules due to an interaction between the driving electric field and the spontaneous polarization becomes strong. As a result, the smectic liquid crystal element which is capable of executing high-speed driving can be provided.

In addition, a second smectic liquid crystal element having a liquid crystal layer showing a smectic phase between a pair of substrates having electrodes, is characterized in that the liquid crystal layer includes a liquid crystal composite showing $\tau-V_{min}$ characteristic in which a $\tau-V$ curve has a minimal value and a polymer which induces spontaneous polarization when a molecular arrangement of the liquid crystal layer is biaxial, and that in the smectic phase, the spontaneous polarization of the polymer and the spontaneous polarization of the liquid crystal molecular of the liquid crystal layer respectively have different codes.

In accordance with the above arrangement, the spontaneous polarization of the whole liquid crystal layer becomes weak in the smectic phase by introducing the polymer having spontaneous polarization of different code with spontaneous polarization of the liquid crystal molecules in to the liquid crystal layer. For this reason, when the driving electric field is applied from the electrode, a dielectric torque, which is generated by an interaction between the dielectric anisotropy and the driving electric field, becomes relatively stronger than a spontaneous polarization torque which is applied to the liquid crystal molecules by an interaction between the spontaneous polarization and the driving electric field.

As a result, the $\tau-V_{min}$ characteristic of the whole liquid crystal layer in the smectic phase is changed, and thus a pulse voltage V in which a pulse width $\tau$ takes a minimal value $\tau_{min}$ shifts to the low voltage side. As a result, when the pulse width $\tau$ of a driving waveform is about the minimal value $\tau_{min}$, the driving voltage of the liquid crystal element can be made lower. As a result, the power consumption can be decreased, and the calorific value can be suppressed.

For fuller understanding of the nature and advantages of the invention, reference should be made to the ensuing detailed description taken in conjunction with the accompanying drawings.

BRIEF DESCRIPTION OF THE DRAWINGS

FIG. 10($b$) is a waveform chart which shows an output waveform of an AC coupling used when the ratio of the switching domain is measured.

FIG. 12 (a) is a drawing which shows an alignment of liquid crystal molecules in SmC* phase showing ferroelectricity.

FIG. 12(b) is a drawing which shows an alignment of molecules when an electric field is applied in a direction, which is perpendicular to the surface of paper and is directed from the back side of paper to the front side, in the case where a helical structure of the liquid crystal molecules is released in a thinner cell than a helical pitch, and at the same time shows a direction of an electric dipole moment of each liquid crystal molecule.

DETAILED DESCRIPTION OF THE PREFERRED EMBODIMENTS

The following describes one embodiment of the present invention on reference to FIGS. 1 through 11. (Basic Arrangement of Ferroelectric Liquid Crystal Cell)

Figure 1:
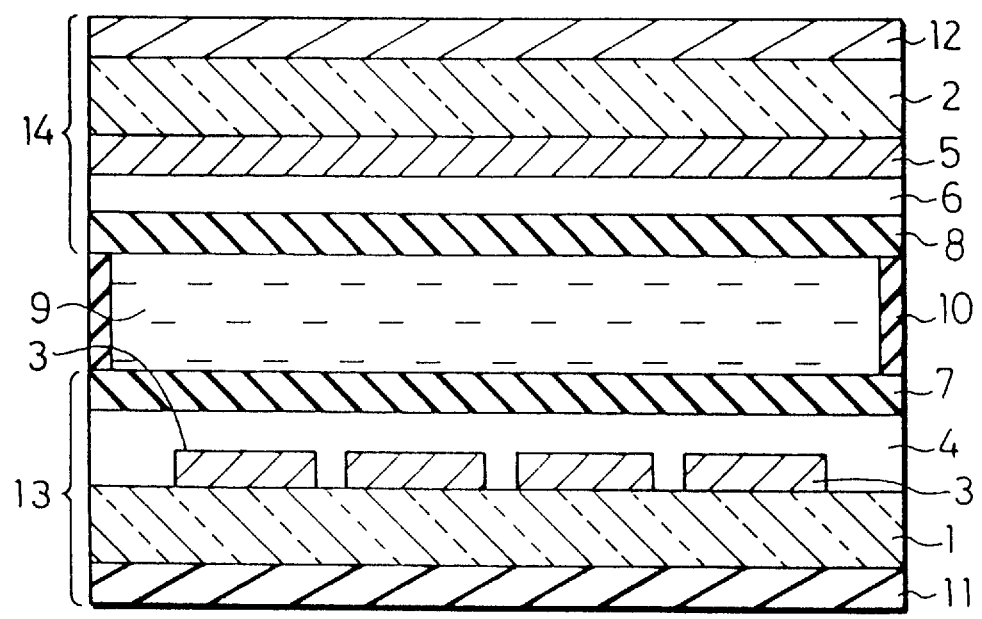
FIG. 1 is a cross sectional view which shows a schematic arrangement of a ferroelectric liquid crystal cell according to one embodiment of the present invention.

First, the description will be given as to a basic arrangement of a ferroelectric liquid crystal cell (smectic liquid crystal element) according to the present embodiment on reference to FIG. 1. The ferroelectric liquid crystal cell is arranged so as to have a signal electrode 3 and a scanning electrode 5, which are composed of transparent ITO films with a thickness of 100 nm, insulating films 4 and 6 with a thickness of 100 nm, alignment films 7 and 8 with a thickness of 70 nm and liquid crystal 9 (liquid crystal layer). The signal electrode 3, the scanning electrode 5, the insulating films 4 and 6, the alignment films 7 and 8 and the liquid crystal 9 are provided between the two glass substrates 1 and 2 which face each other.

A polarizing plate 11 is provided to the outside of the glass substrate 1, and an electrode substrate 13 is formed by the polarizing plate 11, the glass substrate 1, the signal electrode 3, the insulating film 4 and the alignment film 7. In the same manner, a polarizing plate 12 is positioned on the outside of the glass substrate 2. An electrode substrate 14 is formed by the polarizing plate 12, the glass substrate 2, the scanning electrode 5, the insulating film 6 and the alignment film 8.

The signal electrode 3 and the scanning electrode 5 are formed respectively on glass substrates 1 and 2 so as to have stripes, and they intersect perpendicularly to each other. Moreover, the polarizing plates 11 and 12 are positioned so as that their deflecting axes perpendicularly intersect each other. Rubbing treatment is given to the surfaces of the alignment films 7 and 8. Further, the liquid crystal 9 is filled into a space formed between the stuck electrode substrates 13 and 14, and is sealed by a sealant 10. An interval of the electrode substrates 13 and 14 is kept 1.4 μm approximately uniformly by a spacer, not shown.

The ferroelectric liquid crystal cell of the present embodiment is characterized in that the liquid crystal 9 as a liquid crystal layer includes a polymer. The following explains the arrangement of the ferroelectric liquid crystal cell and its manufacturing process more concretely.

(FIRST LIQUID CRYSTAL CELL)

The manufacturing process of a first liquid crystal cell is as follows. First, a polymerization initiator of 2.0% by weight is added to S-configurational acrylate chiral monomer having one photopolymeric functional group, and an ultraviolet ray with wavelength of 365 nm, and strength of 3.5 mW/cm² is projected onto the acrylate chiral monomer for 3 minutes at room temperature so that the acrylate chiral monomer is polymerized. The acrylate chiral monomer having an electric dipole moment induces a negative spontaneous polarization when its molecular arrangement is biaxial. The polymer which is obtained by polymerizing the monomer also induces a negative spontaneous polarization when its molecular arrangement is biaxial.

The polymer is added to a ferroelectric liquid crystal composite which is realized by "SCE8" made by E. Merk in the ratio of 1.5% by weight, and the obtained product is vacuum-injected between the electrode substrates 13 and 14 at 100° C. This is cooled to room temperature (25° C.) at a speed of 2.0° C./min, and it is sealed.

The "SCE8" made by E. Merk has a positive spontaneous polarization in a smectic phase. Namely, in the first liquid crystal cell, the ferroelectric liquid crystal composite and the above polymer respectively have spontaneous polarizations with different codes. Moreover, the "SCE8" has negative dielectric anisotropy, and shows τ–$V_{min}$ characteristic. Phase succession and a phase transition temperature of the "SCE8" are as follows.

I phase–(98° C.)–N* phase–(78° C.)–SmA phase (58° C.)–SmCS phase

In order to confirm the code of the spontaneous polarization, the acrylate chiral monomer was added to a liquid crystal material of smectic C phase without chiral molecules, and a DC electric field was applied to the liquid crystal material to which the acrylate chiral monomer had been added. As a result, the molecular major axis was tilted left towards the electric field direction. This confirmed that the code of the spontaneous polarization of the chiral monomer is negative.

It is necessary that the liquid crystal composite used for the first liquid crystal cell is a smectic liquid crystal material showing τ–$V_{min}$ characteristic, and besides the liquid crystal composite having negative dielectric anisotropy such as "SCE8", a liquid crystal composite having strong positive biaxial dielectric anisotropy can be used.

(SECOND LIQUID CRYSTAL CELL)

A second liquid crystal cell is manufactured by the following manufacturing process. First, a polymerization initiator of 2.0% by weight is added to an R configuration of an acrylate chiral monomer used for the first liquid crystal cell, and an ultraviolet ray with wavelength of 365 nm and strength of 3.5 mW/cm² is projected onto the mixture at room temperature for three minutes so that the mixture is polymerized. The polymer is added to the ferroelectric liquid crystal composite realized by the "SCE8" made by E. Merk in a ratio of 1.5% by weight, and the obtained product is vacuum-injected between the electrode substrates 13 and 14 at 100° C. This is cooled to room temperature at a speed of 2.0° C./min, and it is sealed.

The above monomer has an electric dipole moment, and when the code of the spontaneous polarization was examined, it was positive. A polymer obtained by polymerizing the monomer also induces positive spontaneous polarization when a molecular arrangement is biaxial. Namely, in the second liquid crystal cell, the liquid crystal composite and the polymer has the spontaneous polarization of the same codes.

It is not always necessary that the liquid crystal composite used for the second liquid crystal cell is a material showing τ–$V_{min}$ characteristic.

(THIRD LIQUID CRYSTAL CELL)

A third liquid crystal cell is manufactured by the following process. First, a polymerization initiator of 2.0% by weight is added to an acrylate chiral monomer used for the first liquid crystal cell, and the obtained product is added to the ferroelectric liquid crystal composite realized by the "SCE8" made by E. Merk in a ratio of 1.5% by weight so that the ferroelectric liquid crystal composite is vacuum-sealed between the electrode substrates 13 and 14 at 100° C. Next, an ultraviolet ray with wavelength of 365 nm and strength of 3.5 mW/cm² is projected onto the ferroelectric liquid crystal composite for three minutes at 90° C. at which the ferroelectric liquid crystal composite shows N* phase. Thereafter, this product is cooled to room temperature at a speed of 2.0° C./min so as to be sealed.

In the manufacturing process of the first liquid crystal cell, the acrylate chiral monomer having the different spontaneous polarization from the liquid crystal composite is previously polymerized, and the polymer is added to the liquid crystal composite. On the contrary, in the manufacturing method of the third liquid crystal cell, after a monomer is added to the liquid crystal composite and is injected into a cell, an ultraviolet ray is projected onto the liquid crystal composite to which the monomer has been added.

It is necessary that the liquid crystal composite used for the third liquid crystal cell is a material showing $\tau - V_{min}$ characteristic like the first liquid crystal cell.

(FOURTH LIQUID CRYSTAL CELL)

A fourth liquid crystal cell is manufactured by the following process. First, a polymerization initiator of 2.0% by weight is added to an acrylate chiral monomer used for the second liquid crystal cell, and the obtained product is added to the ferroelectric liquid crystal composite realized by the "SCE8" made by E. Merk in a ratio of 1.5% by weight so that the ferroelectric liquid crystal composite is vacuum-sealed between the electrode substrates 13 and 14 at 100° C. Next, an ultraviolet ray with wavelength of 365 nm and strength of 3.5 mW/cm² is projected onto the ferroelectric liquid crystal composite for three minutes at 90° C. at which the ferroelectric liquid crystal composite shows N* phase. Thereafter, this product is cooled to room temperature at a speed of 2.0° C./min so as to be sealed.

In the manufacturing process of the second liquid crystal cell, the acrylate chiral monomer is previously polymerized, and the polymer is added to the liquid crystal composite. On the contrary, in the manufacturing method of the fourth liquid crystal cell, after a monomer is added to the liquid crystal composite and is injected into a cell, an ultraviolet ray is projected onto the liquid crystal composite to which the monomer has been added.

It is not always necessary that the liquid crystal composite used for the fourth liquid crystal cell is a material showing $\tau - V_{min}$ characteristic like the second liquid crystal cell.

(FIFTH LIQUID CRYSTAL CELL)

A fifth liquid crystal cell can be obtained such that after the first liquid crystal cell is heated to 100° C. and it is maintained at this temperature for 1 minute, it is cooled to room temperature at a speed of 2.0° C./min. Namely, the first liquid crystal cell is reheated to a temperature at which the liquid crystal composite shows I phase (isotropic phase) and is cooled so as to be realigned. As a result, the fifth liquid crystal cell is obtained. Hereinafter, the process of reheating a liquid crystal cell to a temperature showing I phase and cooling it is referred to as a realigning process.

(SIXTH LIQUID CRYSTAL CELL)

A sixth liquid crystal cell can be obtained such that after the second liquid crystal cell is heated to 100° C. and it is maintained at this temperature for 1 minute, it is cooled to room temperature at a speed of 2.0° C./min. Namely, the second liquid crystal cell is reheated to a temperature at which the liquid crystal composite shows I phase and is cooled so as to be realigned. As a result, the sixth liquid crystal cell is obtained.

(SEVENTH LIQUID CRYSTAL CELL)

A seventh liquid crystal cell can be obtained such that after the third liquid crystal cell is heated to 100° C. and it is maintained at this temperature for 1 minute, it is cooled to room temperature at a speed of 2.0° C./min. Namely, the third liquid crystal cell is reheated to a temperature at which the liquid crystal composite shows I phase and is cooled so as to be realigned. As a result, the seventh liquid crystal cell is obtained.

(EIGHTH LIQUID CRYSTAL CELL)

A eighth liquid crystal cell can be obtained such that after the fourth liquid crystal cell is heated to 100° C. and it is maintained at this temperature for 1 minute, it is cooled to room temperature at a speed of 2.0° C./min. Namely, the fourth liquid crystal cell is reheated to a temperature at which the liquid crystal composite shows I phase and is cooled so as to be realigned. As a result, the eighth liquid crystal cell is obtained.

The following describes driving characteristics of the first through eighth liquid crystal cells. Here, for comparison, liquid crystal cells of the first through third comparative examples and conventional liquid crystal cell were prepared as mentioned above, so that their driving characteristics were measured in the same manner.

(FIRST COMPARATIVE EXAMPLE)

A liquid crystal cell of the first comparative example is manufactured by the following process. First, a polymerization initiator of 2.0% by weight is added to a racemic formed monomer, which was obtained by mixing an S-configurational acrylate chiral monomer having one photochemical polymeric functional group with an R-configurational acrylate chiral monomer having one photochemical polymeric functional group in the proportion 1:1, and an ultraviolet ray with wavelength of 365 nm and strength of 3.5 mW/cm² is projected onto the racemic formed monomer to which the polymerization initiator was added for three minutes at room temperature so that the racemic formed monomer is polymerized. The polymer is added to a ferroelectric liquid crystal composite realized by the "SCE8" made by E. Merk in a ratio of 1.5% by weight, and the ferroelectric liquid crystal composite is vacuum-injected between the electrode substrates 13 and 14 at 1000° C. The vacuum-injected ferroelectric liquid crystal composite is cooled to room temperature at a speed of 2.0° C./min and is sealed.

Namely, the liquid crystal cell of the first comparative example is different from the first and second liquid crystal cells in that instead of the polymer composed of the S-configurational and R-configurational acrylate chiral monomers which are added to the first and second liquid crystal cells, a polymer composed of a racemic formed acrylate chiral monomer is added. The other conditions are the same. The racemic formed acrylate chiral monomer does not have spontaneous polarization.

(SECOND COMPARATIVE EXAMPLE)

A liquid crystal cell of the second comparative example is manufactured by the following process. First, a polymerization initiator of 2.0% by weight is added to a racemic formed monomer, which was obtained by mixing an S-configurational acrylate chiral monomer having one photochemical polymeric functional group with an R-configurational acrylate chiral monomer having one photochemical polymeric functional group in the proportion 1:1, and an ultraviolet ray with wavelength of 365 nm and strength of 3.5 mW/cm² is projected onto the racemic formed monomer to which the polymerization initiator was added for three minutes at room temperature so that the racemic formed monomer is polymerized. The polymer is added to a ferroelectric liquid crystal composite realized by the "SCE8" made by E. Merk in a ratio of 1.5% by weight, and the ferroelectric liquid crystal composite is vacuum-injected between the electrode substrates 13 and 14 at 100° C. The vacuum-injected ferroelectric liquid crystal composite is cooled to room temperature at a speed of 2.0° C./min and is sealed so that a ferroelectric liquid crystal cell is obtained.

Next, the liquid crystal cell is heated to 100° C. and is maintained at this temperature for one minute. Thereafter, the liquid crystal cell is cooled to room temperature at a speed of 2.0° C./min so as to be realigned.

Namely, the liquid crystal cell of the second comparative example is different from the fifth and sixth liquid crystal cells in that instead of the polymer composed of the S-configurational and R-configurational acrylate chiral monomers which are added to the fifth and sixth liquid crystal cells, a polymer composed of a racemic formed acrylate chiral monomer is added. The other conditions relating to the photochemical polymerization and the realigning process, etc. are the same. The racemic formed acrylate chiral monomer does not have spontaneous polarization.

(THIRD COMPARATIVE EXAMPLE)

A liquid crystal cell of the third comparative example is manufactured by the following process. First, a polymerization initiator of 2.0% by weight is added to a racemic formed monomer, which was obtained by mixing an S-configurational acrylate chiral monomer with an R-configurational acrylate chiral monomer in the proportion 1:1, and the racemic formed monomer to which the polymerization initiator was added is added to the ferroelectric liquid crystal composite realized by the "SCE8" made by E. Merk in the ratio of 1.5% by weight and the obtained product is vacuum-injected between the electrode substrates 13 and 14 at 100° C. Next, after an ultraviolet ray with wavelength of 365 nm and strength of 3.5 mW/cm$^2$ is projected onto the vacuum-injected product for three minutes at 90° C. at which the ferroelectric liquid crystal composite shows N* phase, the product is cooled to room temperature at a speed of 2.0° C./min so as to be sealed. In such a manner, the ferroelectric liquid crystal cell is obtained.

Next, the ferroelectric liquid crystal cell is heated to 100° C. and is maintained at this temperature for one minute. Thereafter, the ferroelectric liquid crystal cell is cooled to room temperature at a speed of 2.0° C./min so as to be realigned.

Namely, the liquid crystal cell of the third comparative example is different from the seventh and eighth liquid crystal cells in that instead of the polymer composed of the S-configurational and R-configurational acrylate chiral monomers which are added to the seventh and eighth liquid crystal cells, a polymer composed of a racemic formed acrylate chiral monomer is added. The other conditions relating to the photochemical polymerization and the realigning process, etc. are the same. The racemic formed acrylate chiral monomer does not have spontaneous polarization.

(CONVENTIONAL LIQUID CRYSTAL CELL)

The ferroelectric liquid crystal cell was formed by the following conventional manufacturing method. First, a pair of electrode substrates respectively having a signal electrode, a scanning electrode, an insulating film and an alignment film were manufactured by the same manufacturing process as the electrode substrates 13 and 14 according to the present embodiment, and they were stuck so as to face each other. The thickness of the signal electrode, the scanning electrode, the insulating film and the alignment film, the gap between the electrode substrates, etc. were the same as the ferroelectric liquid crystal cell of the present embodiment. The ferroelectric liquid crystal composite realized by the "SCE8" made by E. Merk was vacuum-injected into the gap between the electrode substrates at 100° C., and was cooled to room temperature at a speed of 2.0° C./min so as to be sealed.

The following describes characteristics of the first through eighth liquid crystal cell according to the present embodiment.

In order to observe a change in the strength of the spontaneous polarization due to the addition of the polymer to the ferroelectric liquid crystal composite, the strength of the spontaneous polarization was measured by applying a triangulate wave voltage to the first and second liquid crystal cell according to the present embodiment, the first comparative example and the conventional liquid crystal cell. The measured results are shown in Table 1.

[TABLE 1]

| Strength of spontaneous polarization (nC/cm$^2$) | | | |
|---|---|---|---|
| Conventional liquid crystal cell | First liquid crystal cell | Second liquid crystal cell | First comparative example |
| 3.56 | 2.68 | 3.63 | 3.55 |

As shown in Table 1, the spontaneous polarization of the first liquid crystal cell becomes weaker than the conventional liquid crystal cell using a liquid crystal composite without a polymer because polymer having the negative spontaneous polarization is added to the liquid crystal composite having positive spontaneous polarization. Meanwhile, the spontaneous polarization of the second liquid crystal cell becomes stronger than the conventional liquid crystal cell because the polymer having positive spontaneous polarization is added. Moreover, in the first comparative example, since the added polymer does not have spontaneous polarization, the strength of the spontaneous polarization of the liquid crystal cell is approximately equal to the liquid crystal composite (conventional liquid crystal cell) without polymer.

Figure 2:
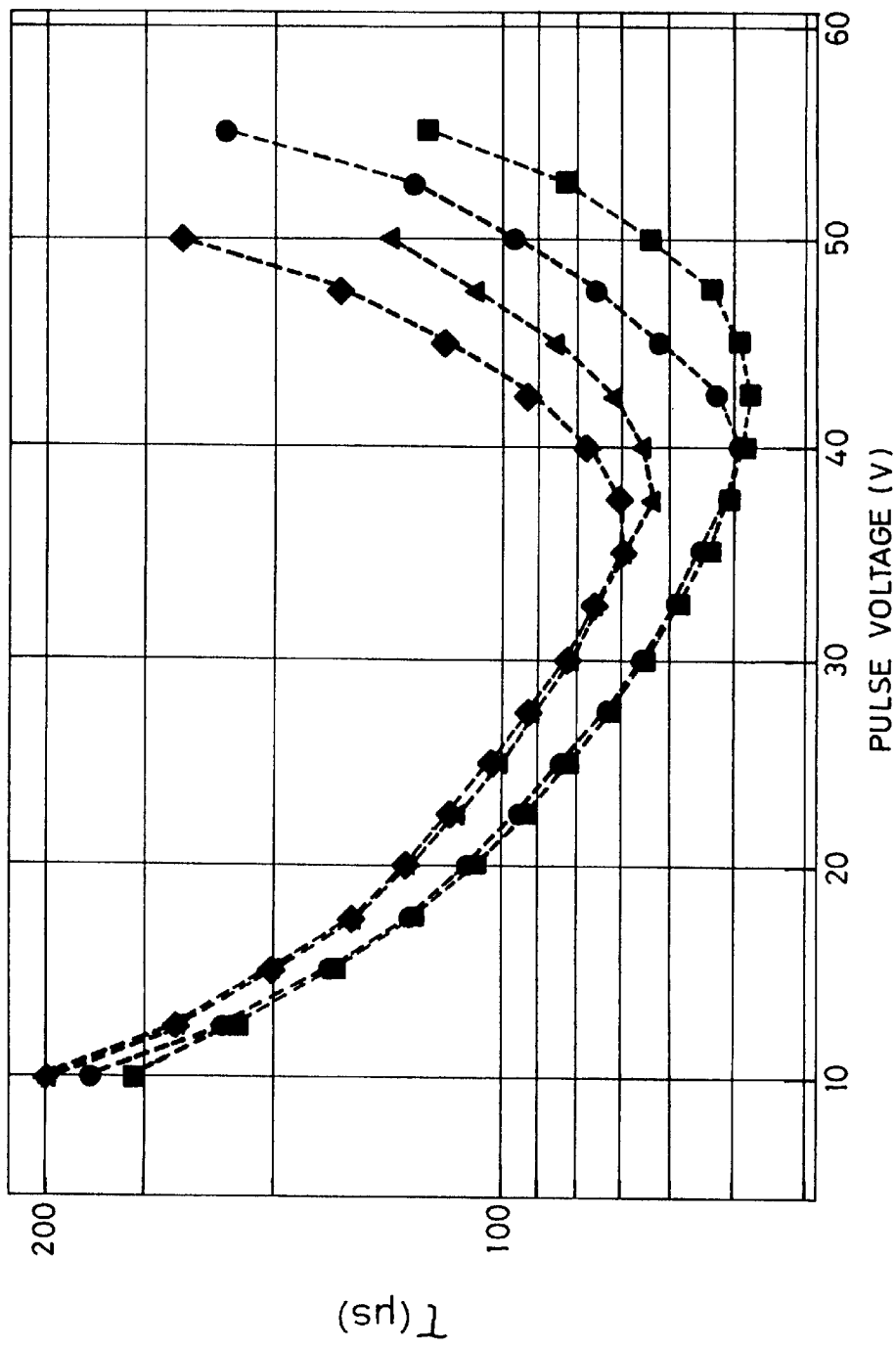
FIG. 2 is a graph which shows $\tau-V$ characteristics of first and second liquid crystal cells, a first comparative example and a conventional liquid crystal cell.

FIG. 2 is a graph which shows a relationship ($\tau$–V characteristic) between a pulse width $\tau$ required for the switching and a pulse peak value V when a pulse voltage is applied in the first and second liquid crystal cells, the first comparative example and the conventional liquid crystal cell.

As shown in the drawing, the $\tau$–V curve of the first liquid crystal cell including a polymer with negative spontaneous polarization wholly shifts to the upper left, and the $\tau$–V curve of the second liquid crystal cell including a polymer with positive spontaneous polarization wholly shifts to the lower right with respect to the $\tau$–V curve of the conventional liquid crystal cell without a polymer. Namely, the $\tau$–V characteristic can be changed by adding a polymer with spontaneous polarization to a liquid crystal composite.

It is found that the graph shown in the drawing has the minimal value and shows so-called $\tau$–$V_{min}$ characteristic. The following simply explains the $\tau$–$V_{min}$ characteristic on reference to FIG. 11.

The $\tau$–$V_{min}$ characteristic is such that a pulse width $\tau$ has the minimal value in a relationship between a pulse voltage V and the pulse width τ for switching all the liquid crystal molecules completely by means of the pulse voltage in the case where a monopulse voltage is applied to a liquid crystal composite.

It is known that a liquid crystal composite having negative dielectric anisotropy and a liquid crystal composite having strong positive biaxial dielectric anisotropy show the τ–$V_{min}$ characteristic. The dielectric anisotropy indicates a difference $\Delta\epsilon = \epsilon_0 - \epsilon_1$ where $\epsilon_0$ is a dielectric constant which is parallel with the director of the liquid crystal molecules and $\epsilon_1$ is a dielectric constant which is perpendicular to the director of the liquid crystal molecules.

In the case where an electric field E is applied, when let θ be the angle between the direction of the director of the liquid crystal molecular and the electric field, a spontaneous torque $T_p$, which is generated by the interaction between the spontaneous polarization and the electric field, is represented by the following equation (1), and a dielectric torque $T_E$, which is generated by the interaction between the dielectric anisotropy and the electric field is represented by the following equation (2).

$$T_p \propto P_s E \qquad (1)$$

$$T_E \propto -\Delta\epsilon E^2 \sin 2\theta \qquad (2)$$

Figure 11:
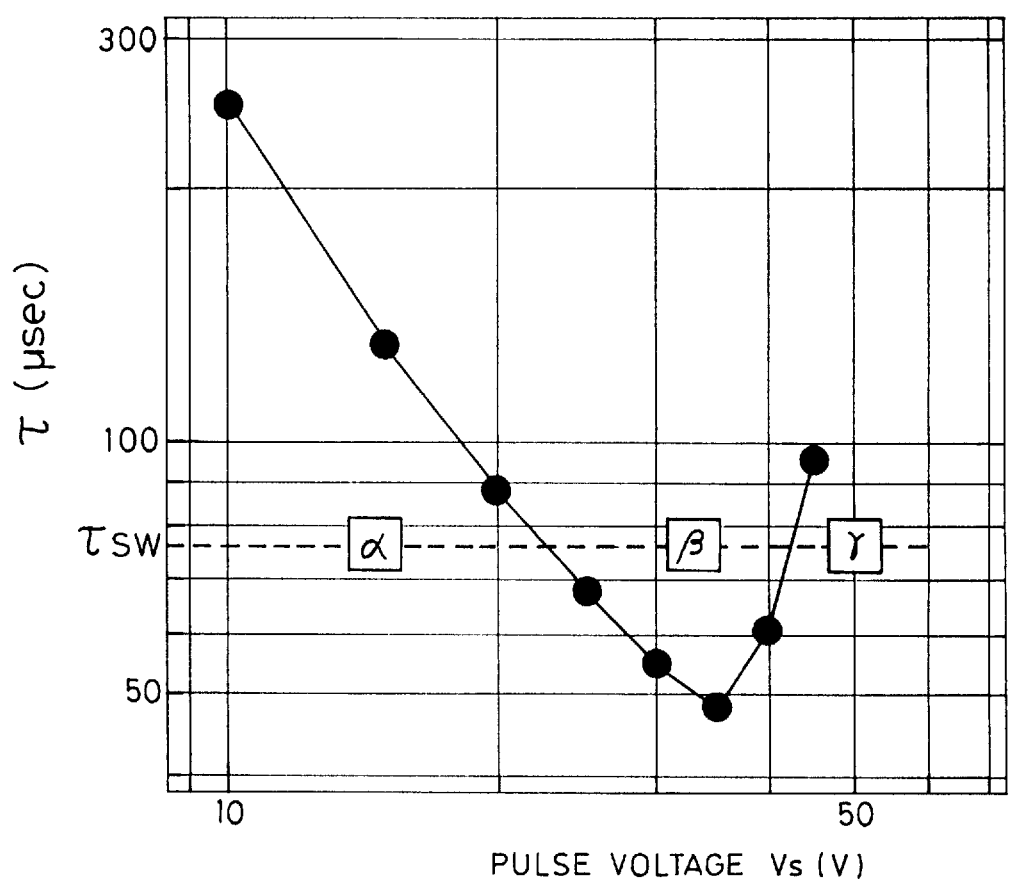
FIG. 11 is a graph which shows the τ–V characteristic of ferroelectric liquid crystal having negative dielectric anisotropy.
Figure 13:
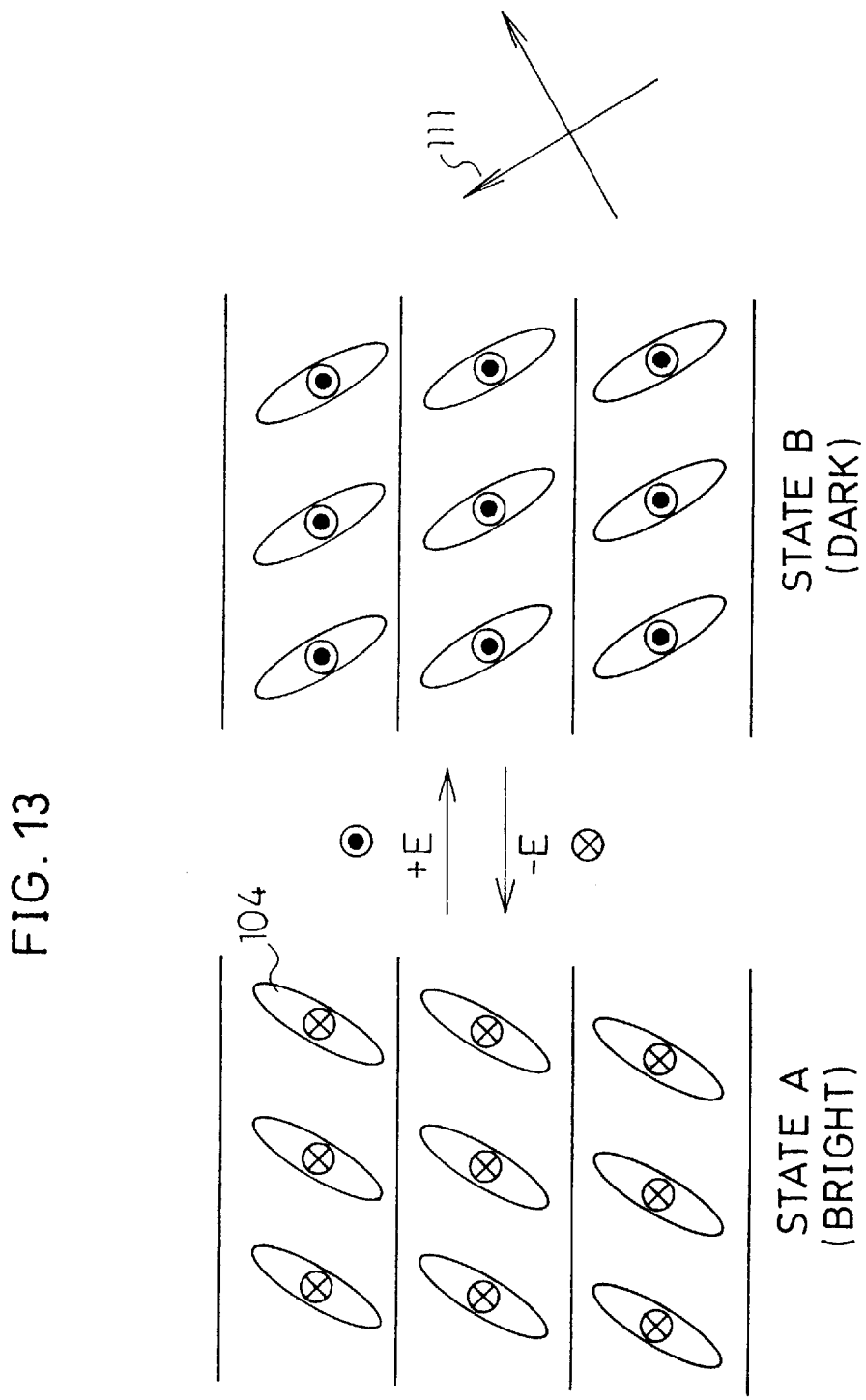
FIG. 13 is a drawing which shows an operating principle of a surface stabilized ferroelectric liquid crystal element.

For this reason, in the case where the dielectric anisotropy is negative, for example, when the dielectric torque functions so that the liquid crystal molecules are parallel with a cell interface, the rising of the optical response is late. At this time, if the absolute value of the negative dielectric anisotropy is large, when the electric field with not less than a certain strength is applied, the dielectric torque surpasses a torque based upon the spontaneous polarization, and it functions so as to force down the switching. For this reason, a longer pulse width is required for switching when a strong electric field is applied, so as shown in FIG. 11, the T-V curve shows the minimal value. This is the τ–$V_{min}$ characteristic.

The utilization of the τ–$V_{min}$ characteristic provides the following advantage. In the case where a monopulse with a pulse width $T_{SW}$ shown in FIG. 11 is applied, the switching does not occur when the pulse peak value $V_s$ is within the range α. If the pulse peak value $V_s$ is within the range β, the switching occurs. If the τ–V characteristic does not have the minimal value, the switching is controlled by using an area between the ranges α and β.

However, if the τ–V characteristic has the minimal value, since the switching does not occur even in the range γ, the switching can be controlled by using an area between the ranges β and γ. In the switching control using the area between the ranges β and γ, since the electric field to be applied is stronger than the switching control using the area between the ranges α and β, this has the advantage of early response. Moreover, if the pulse peak value and the pulse width in the vicinity of the minimal value are used, the responding speed becomes fast, and the driving voltage becomes comparatively low.

For example, as shown in FIG. 2, when the pulse voltage and the pulse width in the vicinity of the minimal value of the τ–V characteristic is utilized, the first liquid crystal cell can be driven by a lower driving voltage than the conventional liquid crystal cell. Moreover, in the second liquid crystal cell, a pulse width which is required for the switching is shorter than the conventional liquid crystal cell, and thus the high-speed driving can be executed.

Here, the τ–V curve of the first comparative example including a racemic formed polymer shifts to the upper left greater than the τ–V curve of the conventional liquid crystal cell, so it is found that the pulse width required for the switching becomes long. This is because viscosity of the liquid crystal is increased due to the racemic formed polymer.

The following describes the driving characteristics of the fifth and sixth liquid crystal cells which have been subject to the realigning treatment by reheating the first and second liquid crystal cells so that I phase is shown.

Figure 3:
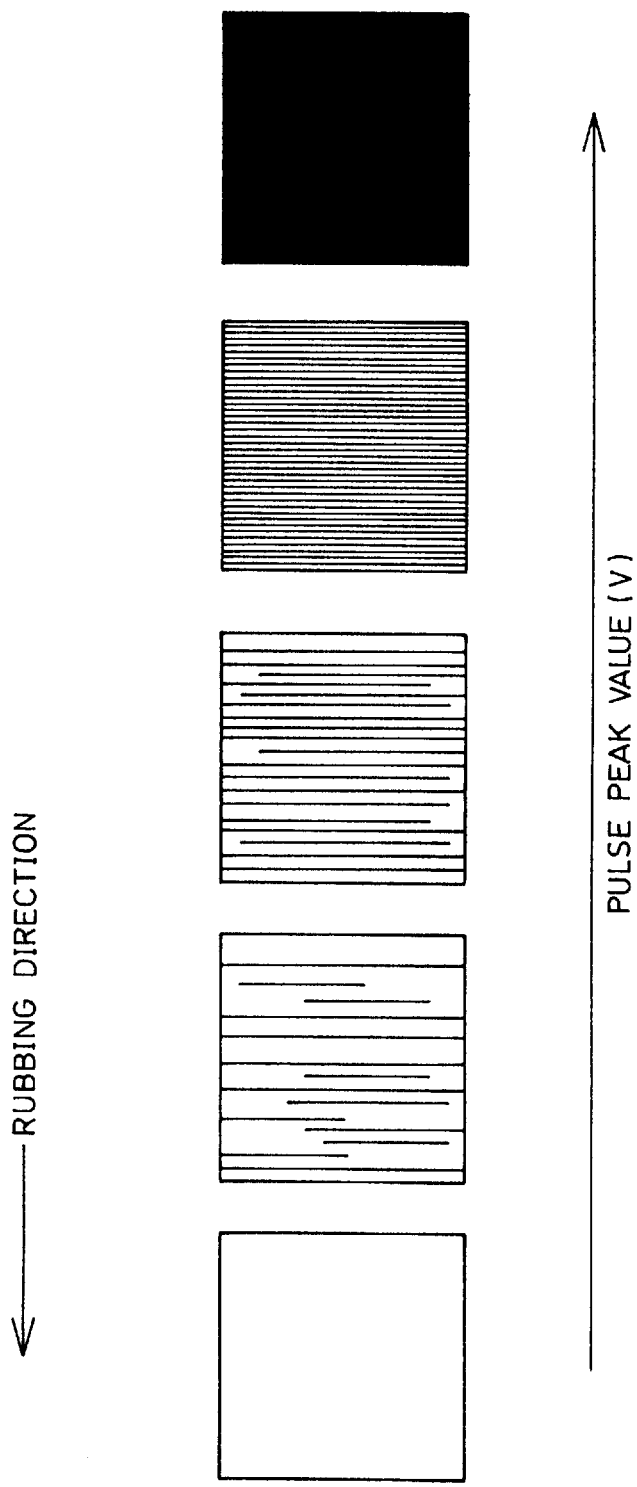
FIG. 3 is a drawing which shows a condition that stripe switching domains appear according to a pulse peak value in an area for one pixel of fifth and sixth liquid crystal cells.

When textures of the fifth and the sixth liquid crystal cells are observed through a microscope, it is found that the polymer is cohesive so as to get caught between the smectic layers. Moreover, when observing these liquid crystal cells while applying a monopulse voltage to the liquid crystal cells, as shown in FIG. 3, it is found that stripe switching domains appear in a direction which is parallel with the layer according to the increase in the pulse peak value.

Five rectangles shown in the drawing respectively correspond a domain where the signal electrode 3 cross the scanning electrode 5, namely, a domain for 1 pixel, and an interval between the stripe switching domains are enough short for a width of one pixel (practically about 0.3 mm). Moreover, since the proportion of the switching domain in one pixel changes according to the pulse peak value, the tone display with desired brightness can be executed by controlling the pulse peak value.

In the I phase, since the molecules of the liquid crystal composite show isotropy, and viscosity becomes small, a polymer and a monomer which have low compatibility with a ferroelectric liquid crystal composite move easily, and thus the molecules start to be cohesive. Thereafter, the cohesive molecules are positioned so as to get caught between the smectic layers by cooling the molecules. As a result, the vicinity of the cohesive molecules has the viscosity which is different from another domains, and a responding characteristic thereof with respect to an applied voltage is also different.

Figure 4:
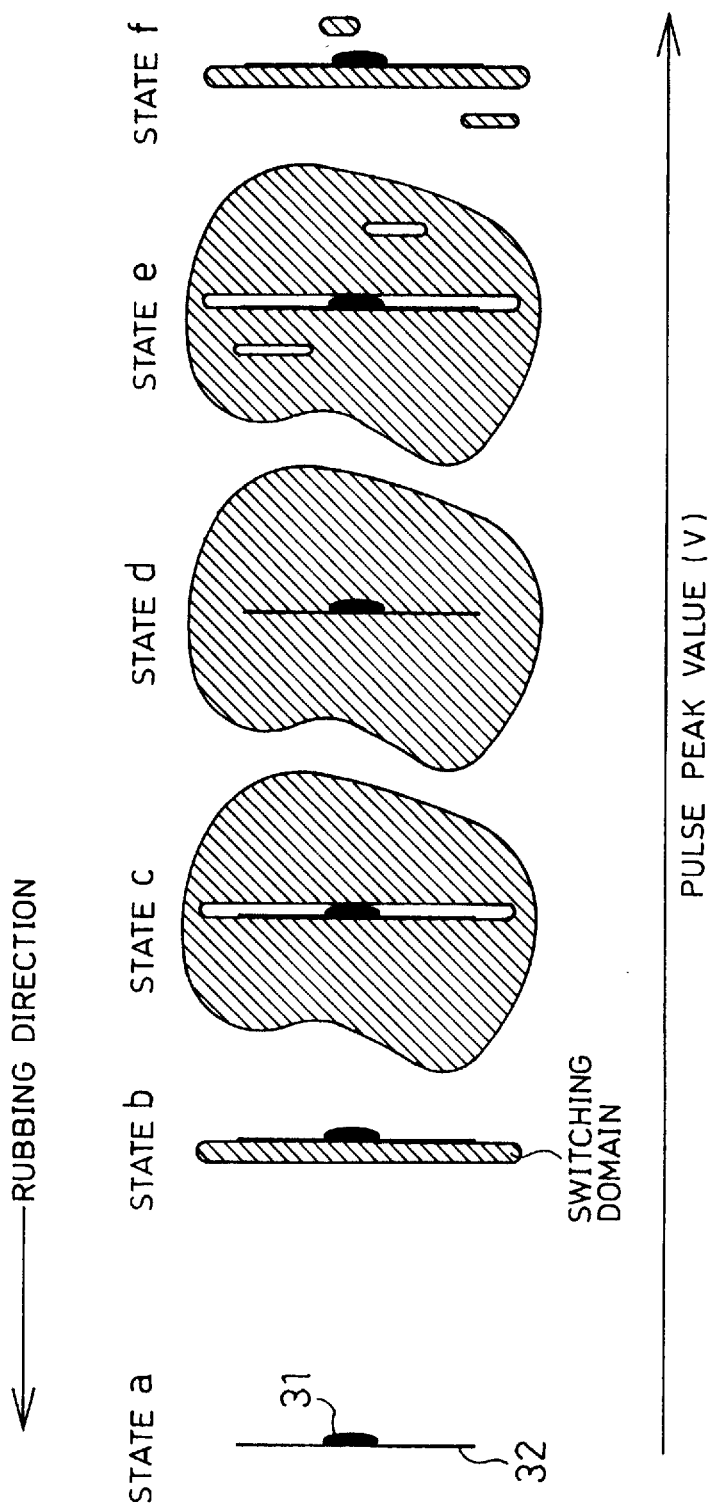
FIG. 4 is a drawing which shows the enlarged switching domain shown in FIG. 3 and shows a condition that the switching domains appear and disappear partially in the proximity of cohesive molecules.

FIG. 4 is an explanatory drawing which shows a state of appearance and disappearance of the switching domains in a local portion on the proximity of the cohesive molecules. As shown in the drawing, when a low pulse voltage is applied, a stripe 32 which is parallel with the layer direction appears (state a) along a cohesive polymer 31. The stripe 32 is a switching domain. As the pulse peak value becomes larger from the state a, a domain for the switching is made wider as shown by the state b and state c, and the whole domain is brought into the switching state (state d) for a pulse voltage of a certain peak value. In the present embodiment, since the ferroelectric liquid crystal composite having negative dielectric anisotropy is used, when the pulse peak value is made higher, a phenomenon that the switching domain disappears (state e and state f) can be seen.

As mentioned above, in the fifth and sixth liquid crystal cells which have been subject to the realigning treatment, the proportion of the switching domain in one pixel can be changed according to the pulse peak value, and thus the tone display can be executed.

Figure 5:
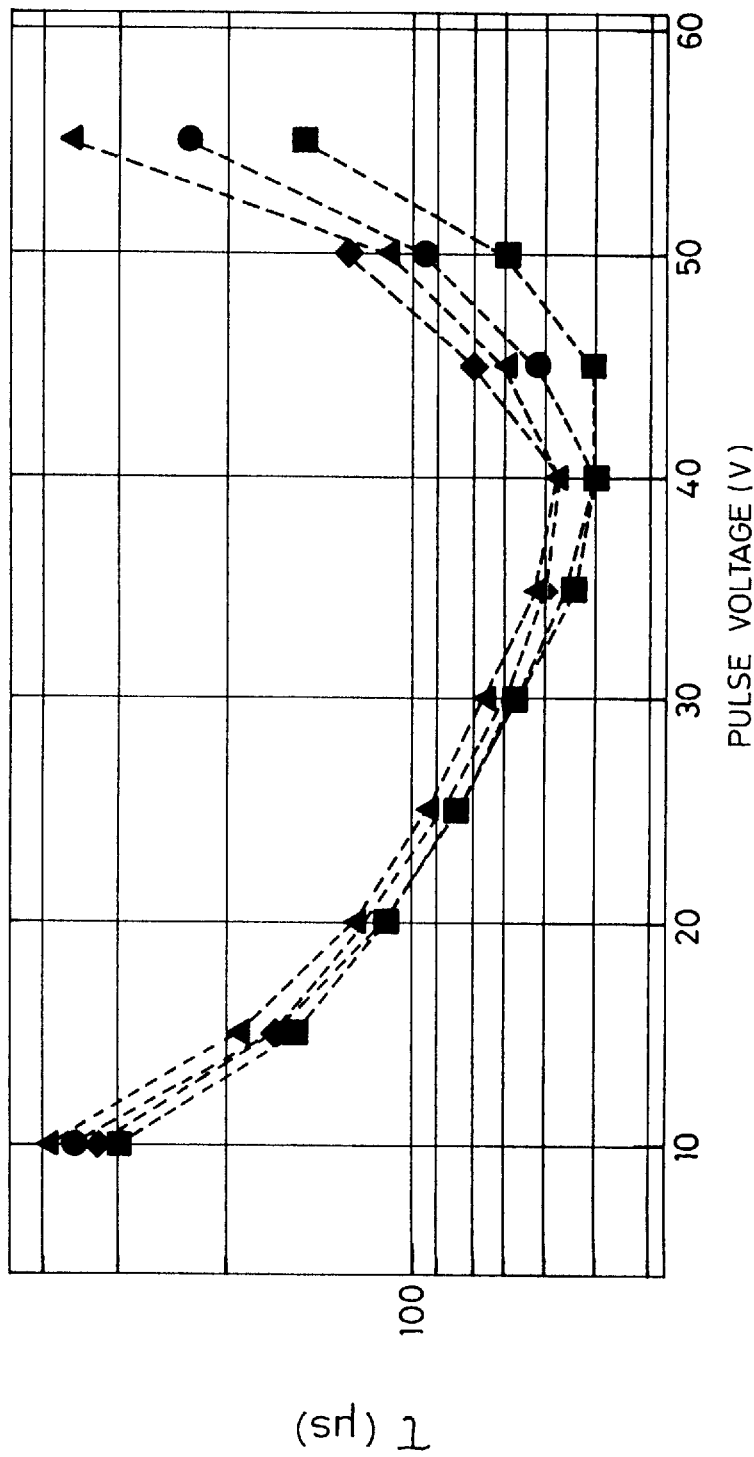
FIG. 5 is a graph which shows the $\tau-V$ characteristics of the fifth and sixth liquid crystal cells, a second comparative example and the conventional liquid crystal cell.

Here, the τ–V characteristic of the fifth and sixth liquid crystal cell is shown in FIG. 5. As is clear from the comparison of FIG. 2 with FIG. 5, the τ–V characteristic of the fifth and sixth liquid crystal cells, which has been manufactured by realigning the first and second liquid crystal cells, approaches the τ–V characteristic of the conventional liquid crystal cell without a polymer in liquid crystal. This is because when the polymer is cohesive due to the realigning process, the liquid crystal is separated from the polymer in some degree, and the effect of the polymer on the liquid crystal is decreased compared with the first and second liquid crystal cells.

The following describes a difference in a driving characteristic between the case where a previously polymerized monomer is added to a liquid crystal composite and the case where after a monomer is added to a liquid crystal composite, the monomer is polymerized based upon the comparison of the fifth and seventh liquid crystal cells, and the comparison of the sixth and eighth liquid crystal cells.

Figure 6:
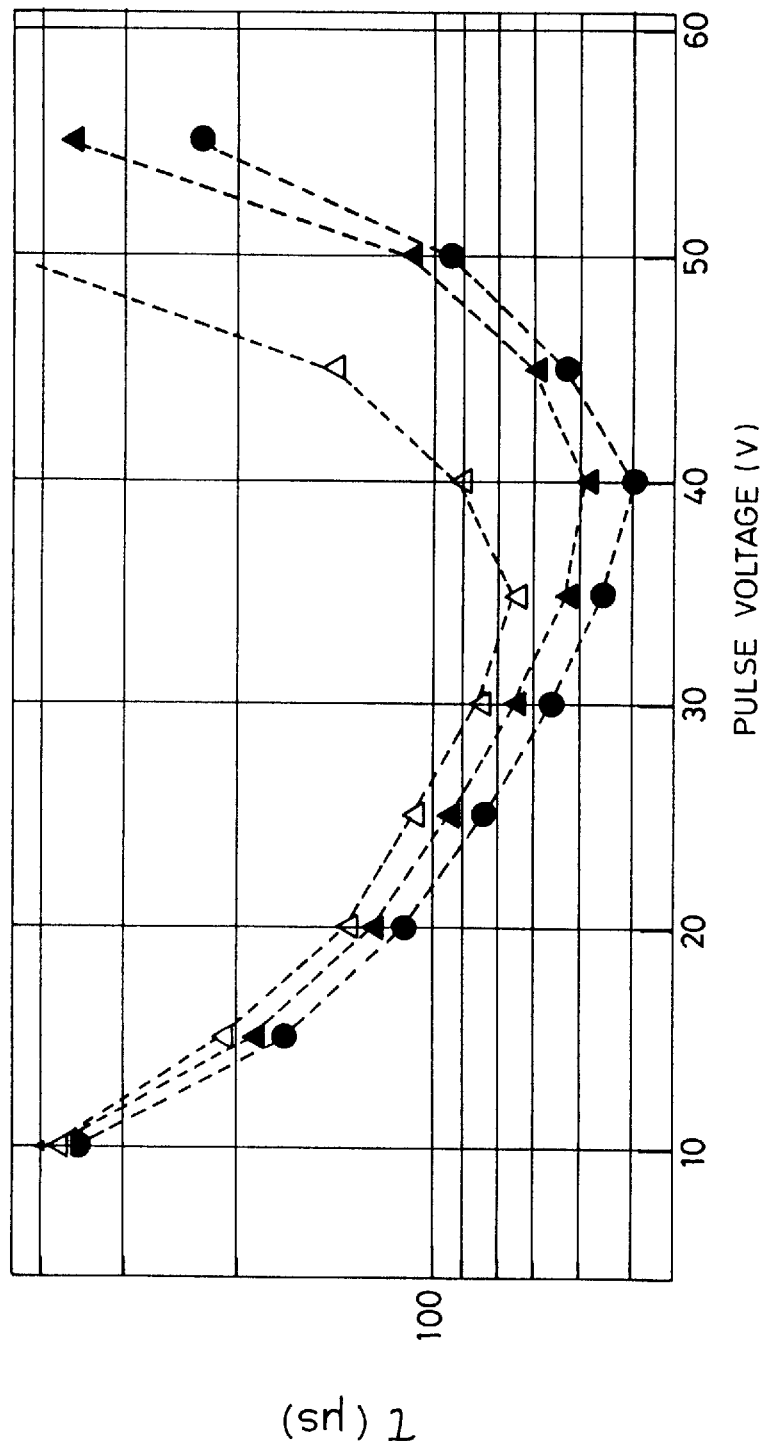
FIG. 6 is a graph which shows the $\tau-V$ characteristics of the fifth and seventh liquid crystal cells and the conventional liquid crystal cell.
Figure 7:
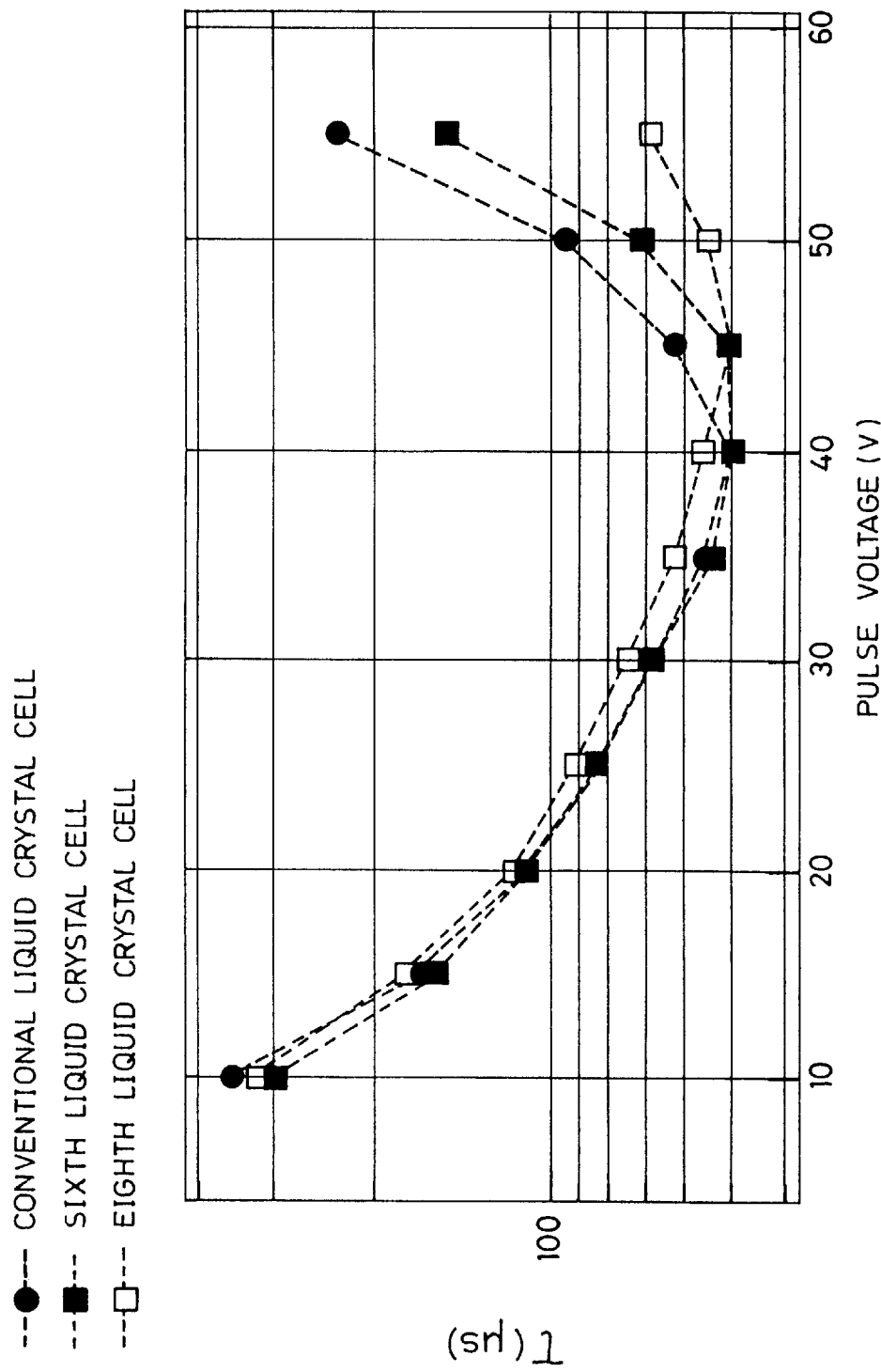
FIG. 7 is a graph which shows the $\tau-V$ characteristics of the sixth and eighth liquid crystal cells and the conventional liquid crystal cell.
Figure 8:
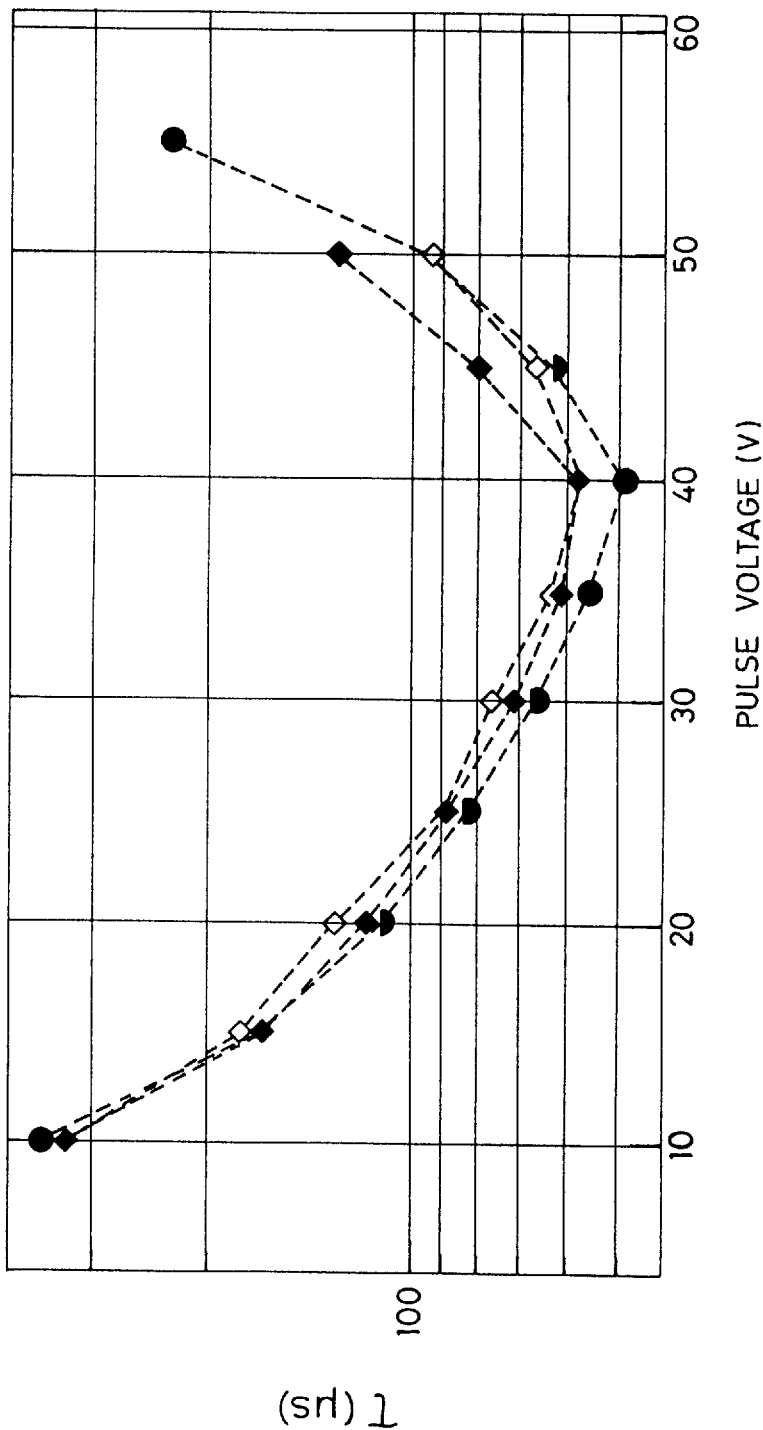
FIG. 8 is a graph which shows the $\tau-V$ characteristics of the second and third comparative examples and the conventional liquid crystal cell.

FIG. 6 is a graph which shows results of measuring the τ–V characteristics of the fifth and seventh liquid crystal cells and the conventional liquid crystal cell. Moreover, FIG. 7 is a graph which shows results of measuring the τ–V characteristics of the sixth and eighth liquid crystal cells and the conventional liquid crystal cell. As is clear from FIGS. 6 and 7, the τ–V characteristic of the liquid crystal cell (seventh and eighth), which was manufactured by injecting the liquid crystal composite to which the monomer was added into a cell, and projecting an ultraviolet ray onto the liquid crystal composite injected into the cell, shifts from the τ–V characteristic of the conventional liquid crystal cell larger than the liquid crystal cell (fifth and sixth) using the liquid crystal composite to which the polymer was previously added.

The reason for this is as follows. If after the monomer is added to the liquid crystal composite and injected into the cell, the exposing process is executed thereon, a polymerization reaction takes place with the monomer being mixed in the liquid crystal molecules. For this reason, the polymerization degree becomes lower than the case where only the monomer is exposed, and the polymerization degree is not uniform. Therefore, it is considered that plural kinds of polymers with different polymerization degrees coexist. For this reason, since the compatibility between the liquid crystal composite and the polymer is high, even if the polymers is made cohesive by the realigning process, it can be considered that the effect of the polymer on the liquid crystal is large.

Since there is no effect on the spontaneous polarization of the racemic form as mentioned above, as shown in FIG. 8, there arise little difference between the case (second comparative example) where the polymer was previously added to the liquid crystal composite and the case (third comparative example) where the liquid crystal composite to which the monomer was added was injected into the cell and an ultraviolet ray was projected thereonto.

Figure 9:
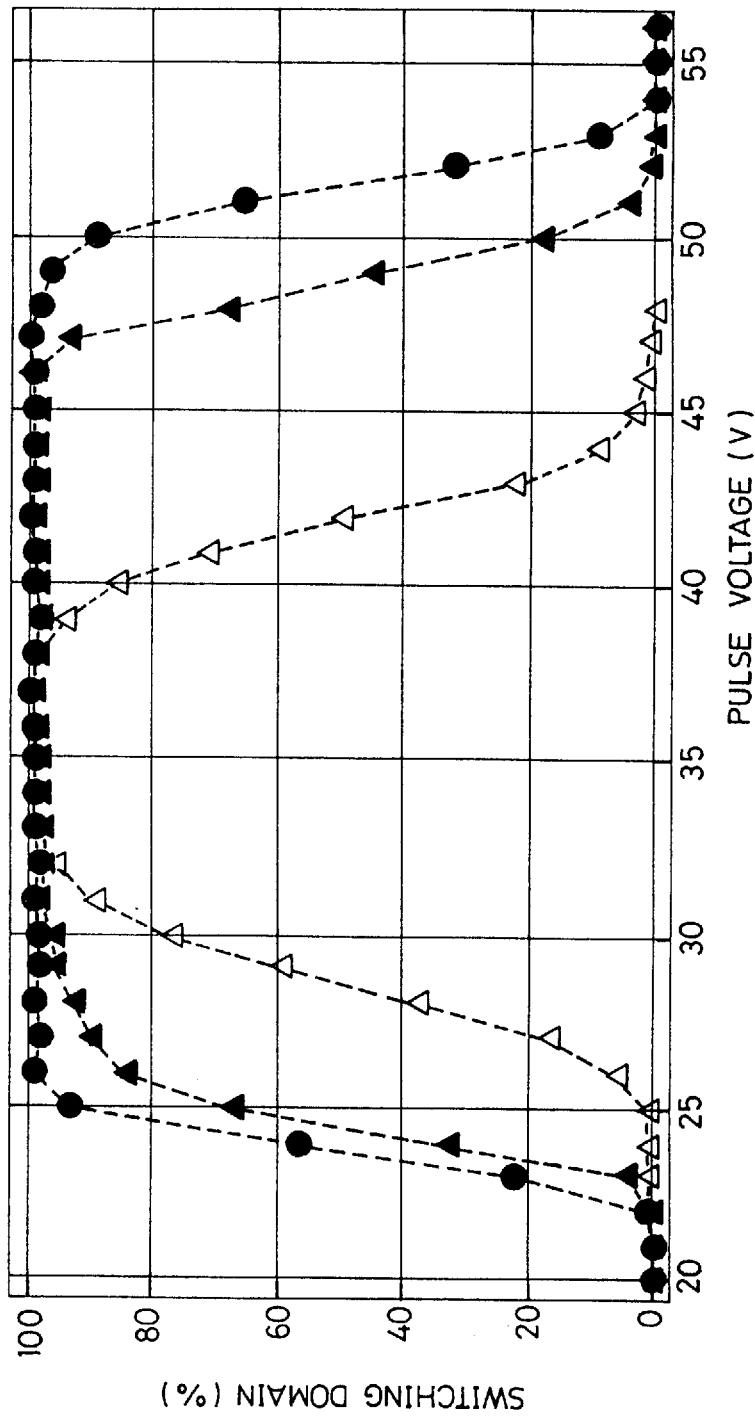
FIG. 9 is a graph which shows a change in a ratio of the switching domain with respect to a change in the pulse voltage in the fifth and seventh liquid crystal cells and the conventional liquid crystal cell.
Figure 10:
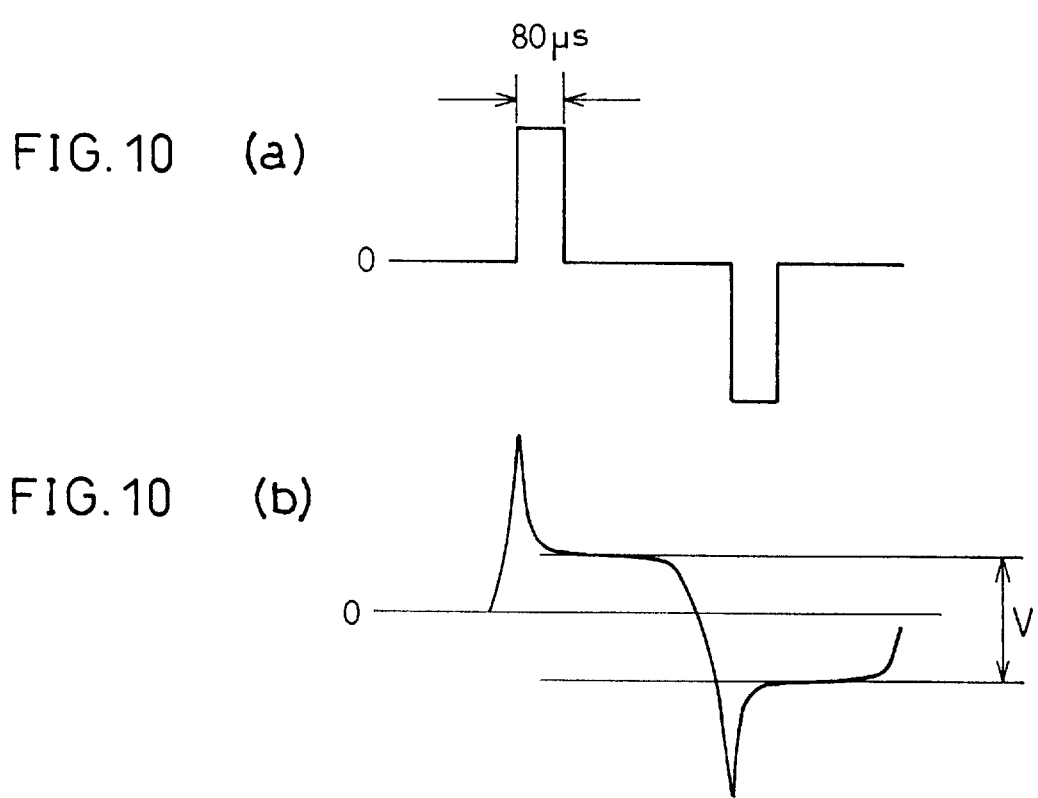
FIG. 10($a$) is a waveform chart which shows a waveform of an input monopulse used when the ratio of the switching domain is measured.

In addition, FIG. 9 is a graph which shows results of measuring a change in a proportion of the switching domain according to the peak value of the pulse voltage in the fifth and seventh liquid crystal cells and the conventional liquid crystal cell. Here, as shown in FIG. 10 (a), a monopulse having constant pulse width (80 μs) is applied as the pulse voltage. Moreover, as shown in FIG. 10 (b), since the ratio of the switching domain is in proportion to the output V detected by the AC coupling, the ratio of the switching domain is obtained by measuring the output V.

In FIG. 9, when the conventional liquid crystal cell is compared with the fifth liquid crystal cell, as to the fifth liquid crystal cell, the slope of the graph on the low voltage side and the high voltage side is gentle. As to the seventh liquid crystal cell, the slope of the graph is more gentle. As to the fifth and seventh liquid crystal cells, tone display is executed by controlling the peak value of the pulse voltage and changing the ratio of the switching domain. In this case, it is preferable that a changing rate of the ratio of the switching domain with respect to the peak value of the pulse voltage is small, because this makes it possible to correct a change in the τ–V characteristic due to non-uniformity of the cell thickness and a change in an ambient temperature.

In addition, shock resistance of the first through eighth liquid crystal cells is improved by introducing the polymer into the liquid crystal 9. For example, when the third liquid crystal cell and the conventional liquid crystal cell were put to the pressure test by using a pressure tester having a disk-like edge of 1.0 cm$^2$, a zig-zag defect occurred in the conventional liquid crystal cell under the pressure of 0.75 kg-weight, and a zig-zag defect occurred in the third liquid crystal cell under the pressure of 1.00 kg-weight. As a result, the ferroelectric liquid crystal cell having the improved shock resistance can be realized by a manufacturing method which is easier than a method of forming a spacer wall, etc.

The strength of the spontaneous polarization torque and the dielectric torque and the viscosity of liquid crystal 9 can be adjusted by adjusting an amount of polymer to be introduced into the liquid crystal 9, and thus the driving characteristic of the liquid crystal 9 can be changed. It is preferable that the adding ratio of the polymer is not less than 1.5% by weight with respect to the liquid crystal composite.

In the present embodiment, in order to define a difference in the driving characteristic among the first through eighth liquid crystal cells, the S-configurational acrylate chiral monomer was used as a monomer which induces negative spontaneous polarization in the first liquid crystal cell, and the R-configurational acrylate chiral monomer was used as a monomer which induces positive spontaneous polarization in the second liquid crystal cell. However, the monomers which were presented in the first through eighth liquid crystal cells are only examples, so various materials can be used as long as they are monomers which induce positive or negative spontaneous polarization.

The ferroelectric liquid crystal composite having negative dielectric anisotropy was used as a liquid crystal material showing the τ–$V_{min}$ characteristic, but a material having strong positive biaxial dielectric anisotropy, which shows the same τ–$V_{min}$ characteristic may be used.

The smectic liquid crystal element of the present invention (for example, the second liquid crystal cell), having a liquid crystal layer showing a smectic phase between a pair of substrates having at least electrodes, is arranged so that a polymer, which induces spontaneous polarization when its molecular arrangement is biaxial, is introduced into the liquid crystal layer, and that in the smectic phase, the spontaneous polarization of the polymer and the spontaneous polarization of the liquid crystal molecular of the liquid crystal layer have the same codes.

In accordance with the above arrangement, the strength of the spontaneous polarization of the whole liquid crystal layer is increased in the smectic phase by introducing the polymer having spontaneous polarization with the same code as the spontaneous polarization of the liquid crystal molecules into liquid crystal layer. For this reason, when the driving electric field is applied from the electrode, a driving force, which is applied to the liquid crystal molecules due to an interaction between the driving electric field and the spontaneous polarization, becomes strong. As a result, the smectic liquid crystal element Which is capable of executing high-speed driving can be provided.

In addition, in the above smectic liquid crystal element (for example, the second liquid crystal cell), the liquid crystal layer is preferably formed by using a liquid crystal composite showing τ–$V_{min}$ characteristic.

The liquid crystal cell using the liquid crystal composite showing the τ–$V_{min}$ characteristic has an advantage that the high-speed driving is possible, and the responding speed can be further improved by adding a polymer having spontaneous polarization with the same code as the liquid crystal composite. As a result, the smectic liquid crystal element which is capable of executing higher-speed driving can be realized.

In addition, in the smectic liquid crystal element (for example, the second liquid crystal cell), the liquid crystal layer is preferably formed by using a liquid crystal composite having negative dielectric anisotropy.

Since the liquid crystal composite having negative dielectric anisotropy shows the $\tau-V_{min}$ characteristic, the smectic liquid crystal element which is capable of executing higher-speed driving can be realized.

In addition, a smectic liquid crystal element of the present invention (the first liquid crystal cell) having a liquid crystal layer showing a smectic phase between a pair of substrates having at least electrodes, is arranged so that the liquid crystal layer includes a liquid crystal composite showing $\tau-V_{min}$ characteristic and a polymer which induces spontaneous polarization when a molecular arrangement of said liquid crystal layer is biaxial, and that in the smectic phase, the spontaneous polarization of the polymer and the spontaneous polarization of the liquid crystal molecular of the liquid crystal layer respectively have different codes.

In accordance with the above arrangement, the spontaneous polarization of the whole liquid crystal layer becomes weak in the smectic phase by introducing the polymer having spontaneous polarization of different code with spontaneous polarization of the liquid crystal molecules into the liquid crystal layer. For this reason, when the driving electric field is applied from the electrode, a dielectric torque, which is generated by an interaction between the dielectric anisotropy and the driving electric field, becomes comparatively stronger than a spontaneous polarization torque which is applied to the liquid crystal molecules by an interaction between the spontaneous polarization and the driving electric field.

As a result, the $\tau-V_{min}$ characteristic of the whole liquid crystal layer in the smectic phase is changed, and thus a pulse voltage V in which a pulse width $\tau$ takes a minimal value $\tau_{min}$ shifts to the low voltage side. As a result, when the pulse width $\tau$ of a driving waveform is about the minimal value $\tau_{min}$, the driving voltage of the liquid crystal element can be made lower. As a result, the power consumption can be decreased, and the calorific value can be suppressed.

In order to realize tone display with the smectic liquid crystal elements (for examples, the first and second liquid crystal cells), it is preferable that the polymer is cohesive between the smectic layers.

In accordance with the above arrangement, since the viscosity in the proximity of the cohesive polymer between the smectic layers is different from in another domain, a responding characteristic with respect to the driving electric field to be applied from the electrode is also different. As a result, the switching domain partially appears and disappears in the proximity where the polymer is cohesive. Since the switching domain is enough smaller than one pixel, the smectic liquid crystal element which is capable of executing tone display can be provided.

In addition, it is preferable that in the smectic liquid crystal elements (for example, the first and second liquid crystal cells), the polymer has an electric dipole moment and is optically active.

In addition, in the smectic liquid crystal elements (for example, the first and second liquid crystal cells), polymer is formed by photochemically polymerizing a monomer having one photochemically polymeric functional group.

In this arrangement, since the alignment of the liquid crystal is not deteriorated, a deterioration in display quality such as contrast is prevented, thereby making it possible to maintain the satisfactory display quality.

In addition, the first method of manufacturing a smectic liquid crystal element of the present invention (for example, the second liquid crystal cell) having a liquid crystal layer showing a smectic phase between a pair of substrates having at least electrodes, includes the step of mixing a polymer, which induces spontaneous polarization when a molecular arrangement of the liquid crystal layer is biaxial, with a liquid crystal composite which has spontaneous polarization of the same codes as the polymer in the smectic phase, and the step of introducing a mixture of the polymer and the liquid crystal composite between the substrates.

In accordance with the above manufacturing method, in the smectic phase, the spontaneous polarization of the whole liquid crystal layer is increased by introducing the polymer, having the spontaneous polarization of the same code as the spontaneous polarization of the liquid crystal molecules, into the liquid crystal layer. As a result, when a driving electric field is applied from the electrode, a driving force, which is applied to the liquid crystal molecules by an interaction between the driving electric field and the spontaneous polarization, is increased, and thus the smectic liquid crystal element in which the responding speed is further improved can be provided.

In addition, a second method of manufacturing a smectic liquid crystal element of the present invention (for example, the first liquid crystal cell) having a liquid crystal layer showing a smectic phase between a pair of substrates having at least electrodes, includes the step of mixing a polymer, which induces spontaneous polarization when a molecular arrangement of the liquid crystal layer is biaxial, with a liquid crystal composite, which has spontaneous polarization with the different codes from the polymer in the smectic phase and shows $\tau-V_{min}$ characteristic, and the step of introducing a mixture of the polymer and the liquid crystal composite between the substrates.

In accordance with the above arrangement, in the smectic phase, the spontaneous polarization of the whole liquid crystal layer is decreased by introducing the polymer, having the spontaneous polarization of different code from the spontaneous polarization of the liquid crystal molecules, into the liquid crystal layer. For this reason, when a driving electric field is applied from the electrode, a dielectric torque, which is generated by a n inter action between the dielectric anisotropy and the driving electric field, becomes comparatively stronger than a spontaneous polarization torque which is applied to the liquid crystal molecules by an interaction between the spontaneous polarization and the driving electric field. As a result, the $\tau-V_{min}$ characteristic of the whole liquid crystal layer is changed in the smectic phase, and thus, a pulse voltage V, in which a pulse width $\tau$ takes a minimal value $\tau$min, shifts to the low voltage side. As a result, the smectic liquid crystal element which is capable of executing low-voltage driving can be provided.

In addition, a third method of manufacturing a smectic liquid crystal element of the present invention (for example, the fourth liquid crystal cell) having a liquid crystal layer showing a smectic phase between a pair of substrates having at least electrodes, includes the step of mixing a photochemically polymeric monomer, which induces spontaneous polarization when a molecular arrangement is biaxial, with a liquid crystal composite having spontaneous polarization with the same codes as the monomer in the smectic phase, the step of introducing a mixture of the monomer and the liquid crystal composite between the substrates and the step of polymerizing the monomer by projecting a light onto the mixture.

In accordance with the above manufacturing method, since a polymeric reaction takes place with the monomer being mixed with the liquid crystal, the polymerization degree of the formed polymer becomes uneven more than the case where a light is projected onto only the monomer so that the monomer is polymerized. Namely, in the liquid crystal layer to be formed by this manufacturing method, plural kinds of polymers with different polymerization degrees coexist. For this reason, since the compatibility between the liquid crystal and the polymer becomes high, the effect of the polymer on the liquid crystal is large.

In the smectic phase, since the monomer and the liquid crystal composite have the spontaneous polarization of the same codes, and as mentioned above, the compatibility between the polymer formed from the monomer and the liquid crystal is high, the spontaneous polarization of the whole liquid crystal layer is increased effectively, and the driving force, which is generated by an interaction between the driving electric field to be applied from the electrode and the spontaneous polarization, is increased. Moreover, since only a comparatively small amount of the monomer is required for addition, the alignment of the liquid crystal is not disordered. As a result, the liquid crystal element, which is capable of executing high-speed driving and ensuring high display quality, can be provided.

In addition, a fourth method of manufacturing a smectic liquid crystal element of the present invention (for example, the third liquid crystal cell) having a liquid crystal layer showing a smectic phase between a pair of substrates having at least electrodes, includes the step of mixing a photochemically polymeric monomer, which induces spontaneous polarization when a molecular arrangement is biaxial, with a liquid crystal composite, which has spontaneous polarization with the different codes from the monomer in the smectic phase and shows $\tau$–$V_{min}$ characteristic, the step of introducing a mixture of the monomer and the liquid crystal composite between the substrates and the step of polymerizing the monomer by projecting a light onto the mixture.

In accordance with the above manufacturing method, since a polymeric reaction takes place with the monomer being mixed with the liquid crystal, the polymerization degree of the formed polymer becomes uneven more than the case where a light is projected onto only the monomer so that the monomer is polymerized. Namely, in the liquid crystal layer to be formed by this manufacturing method, plural kinds of polymers with different polymerization degrees coexist. For this reason, since the compatibility between the liquid crystal and the polymer becomes high, the effect of the polymer on the liquid crystal is large.

In the smectic phase, since the monomer and the liquid crystal composite have the spontaneous polarization of different codes from each other, and as mentioned above, the compatibility between the polymer formed from the monomer and the liquid crystal is high, the spontaneous polarization of the whole liquid crystal layer is decreased effectively, and a pulse voltage V, in which a pulse width $\tau$ takes a minimal value in the $\tau$–$V_{min}$ characteristic, shifts from the $\tau$–$V_{min}$ characteristic of the liquid crystal composite to the low voltage side greatly. Moreover, since only a small amount of monomer is required for addition, the alignment of the liquid crystal is not ordered. As a result, the liquid crystal element, which is capable of executing low-voltage driving and ensuing high display quality, can be provided.

In addition, the first through fourth manufacturing methods further have the first aligning step of cooling the mixture which has been introduced between the substrates at a temperature where the liquid crystal composite shows a higher phase than the smectic phase, and the second aligning step of heating the mixture, which has been subject to the first aligning step, to a temperature where the liquid crystal composite shows an isotropic phase. In accordance with this manufacturing method, the smectic liquid crystal element which is capable of executing display (the fifth through eighth liquid crystal cells) can be provided.

Namely, in accordance with this manufacturing method, in the case where the mixture is heated to a temperature where the liquid crystal composite shows the isotropic phase in the second aligning step, the liquid crystal molecules have isotropy, and the viscosity is lowered. For this reason, the polymer or monomer added to the liquid crystal moves easily and thus starts to become cohesive. Thereafter, when the temperature is lowered to the smectic phase, the cohesive molecules are arranged so as to get caught between the smectic layers. Since the viscosity in the proximity of the cohesive molecules between the smectic layers is different from another area, the responding characteristic with respect to the driving electric field to be applied from the electrode becomes different. As a result, the switching domain appears and disappears partially in the proximity of the cohesive polymer. Since the switching domain is enough smaller than one pixel, the smectic liquid crystal element which is capable of executing display can be provided.

In addition, in the first through fourth manufacturing methods, it is preferable that the monomer has an electric dipole moment and is optically active.

In addition, in the first through fourth manufacturing methods, it is preferable that the monomer has one photochemically polymeric functional group.

As a result, in the smectic liquid crystal element, the responding speed can be improved, or the driving voltage can be made low without deteriorating the alignment of the liquid crystal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A smectic liquid crystal element having a liquid crystal layer showing a smectic phase between a pair of substrates having electrodes, said smectic liquid crystal element wherein:

a polymer, which induces spontaneous polarization when its molecular arrangement is biaxial, is introduced into said liquid crystal layer, in the smectic phase, the spontaneous polarization of the polymer and the spontaneous polarization of the liquid crystal molecules of said liquid crystal layer have the same codes.

2. The smectic liquid crystal element according to claim 1, wherein said liquid crystal layer includes a liquid crystal composite showing $\tau$–$V_{min}$ characteristic in which a $\tau$–V curve has a minimal value.

3. The smectic liquid crystal element according to claim 2, wherein said liquid crystal composite has a negative dielectric anisotropy.

4. The smectic liquid crystal element according to claim 1, wherein the polymer is cohesive between the smectic layers of the liquid crystal layer.

5. The smectic liquid crystal element according to claim 1, wherein the polymer has an electric dipole moment and is optically active.

6. The smectic liquid crystal element according to claim 1, wherein the polymer is formed by photochemically polymerizing a monomer having one photochemically polymeric functional group.

7. A smectic liquid crystal element having a liquid crystal layer showing a smectic phase between a pair of substrates having electrodes, said smectic liquid crystal element wherein:

said liquid crystal layer includes a liquid crystal composite showing $\tau\text{-}V_{min}$ characteristic in which a $\tau\text{-}V$ curve has a minimal value and a polymer which induces spontaneous polarization when its molecular arrangement is biaxial, in the smectic phase, the spontaneous polarization of the polymer and the spontaneous polarization of the liquid crystal molecules of said liquid crystal layer respectively have different codes.

8. The smectic liquid crystal element according to claim 7, wherein the polymer is cohesive between the smectic layers of the liquid crystal layer.

9. The smectic liquid crystal element according to claim 7, wherein the polymer has an electric dipole moment and is optically active.

10. The smectic liquid crystal element according to claim 7, wherein the polymer is formed by photochemically polymerizing a monomer having one photochemically polymeric functional group.

11. A method of manufacturing a smectic liquid crystal element having a liquid crystal layer showing a smectic phase between a pair of substrates having electrodes, comprising the steps of:

mixing a polymer, which induces spontaneous polarization when its molecular arrangement is biaxial, with a liquid crystal composite which has spontaneous polarization of the same codes as the polymer in the smectic phase; and introducing a mixture of the polymer and the liquid crystal composite between the substrates.

12. The method of manufacturing a smectic liquid crystal element according to claim 11, further comprising:

the first aligning step of cooling the mixture which has been introduced between the substrates at a temperature where the liquid crystal composite shows a higher phase than the smectic phase; and the second aligning step of heating the mixture, which has been subject to the first aligning step, to a temperature where the liquid crystal composite shows a isotropic phase.

13. The method of manufacturing a smectic liquid crystal element according to claim 11, wherein the polymer has an electric dipole moment and is optically active.

14. The method of manufacturing a smectic liquid crystal element according to claim 11, wherein the polymer is formed by photochemically polymerizing a monomer having one photochemically polymeric functional group.

15. A method of manufacturing a smectic liquid crystal element having a liquid crystal layer showing a smectic phase between a pair of substrates having electrodes, comprising the steps of:

mixing a polymer, which induces spontaneous polarization when its molecular arrangement is biaxial, with a liquid crystal composite, which has spontaneous polarization with the different codes from the polymer in the smectic phase and shows $\tau\text{-}V_{min}$ characteristic in which a $\tau\text{-}V$ curve has a minimal value; and introducing a mixture of the polymer and the liquid crystal composite between the substrates.

16. The method of manufacturing a smectic liquid crystal element according to claim 15, further comprising:

the first aligning step of cooling the mixture which has been introduced between the substrates at a temperature where the liquid crystal composite shows a higher phase than the smectic phase; and the second aligning step of heating the mixture, which has been subject to the first aligning step, to a temperature where the liquid crystal composite shows a isotropic phase.

17. The method of manufacturing a smectic liquid crystal element according to claim 15, wherein the polymer has an electric dipole moment and is optically active.

18. The method of manufacturing a smectic liquid crystal element according to claim 15, wherein the polymer is formed by photochemically polymerizing a monomer having one photochemically polymeric functional group.

19. A method of manufacturing a smectic liquid crystal element having a liquid crystal layer showing a smectic phase between a pair of substrates having electrodes, comprising the steps of:

mixing a photochemically polymeric monomer, which induces spontaneous polarization when its molecular arrangement is biaxial, with a liquid crystal composite having spontaneous polarization with the same codes as the monomer in the smectic phase;

introducing a mixture of the monomer and the liquid crystal composite between the substrates; and polymerizing the monomer by projecting a light onto the mixture.

20. The method of manufacturing a smectic liquid crystal element according to claim 19, further comprising:

the first aligning step of cooling the mixture which has been introduced between the substrates at a temperature where the liquid crystal composite shows a higher phase than the smectic phase; and the second aligning step of heating the mixture, which has been subject to the first aligning step, to a temperature where the liquid crystal composite shows a isotropic phase.

21. The method of manufacturing a smectic liquid crystal element according to claim 19, wherein the monomer has an electric dipole moment and is optically active.

22. The method of manufacturing a smectic liquid crystal element according to claim 19, wherein the monomer has one photochemically polymeric functional group.

23. A method of manufacturing a smectic liquid crystal element having a liquid crystal layer showing a smectic phase between a pair of substrates having electrodes, comprising the steps of:

mixing a photochemically polymeric monomer, which induces spontaneous polarization when its molecular arrangement is biaxial, with a liquid crystal composite, which has spontaneous polarization with the different codes from the monomer in the smectic phase and shows $\tau\text{-}V_{min}$ characteristic in which a $\tau\text{-}V$ curve has a minimal value;

introducing a mixture of the monomer and the liquid crystal composite between the substrates; and polymerizing the monomer by projecting a light onto the mixture.

24. The method of manufacturing a smectic liquid crystal element according to claim 23, further comprising:

the first aligning step of cooling the mixture which has been introduced between the substrates at a temperature where the liquid crystal composite shows a higher phase than the smectic phase; and the second aligning step of heating the mixture, which has been subject to the first aligning step, to a temperature where the liquid crystal composite shows a isotropic phase.

25. The method of manufacturing a smectic liquid crystal element according to claim 23, wherein the monomer has an electric dipole moment and is optically active.

26. The method of manufacturing a smectic liquid crystal element according to claim 23, wherein the monomer has one photochemically polymeric functional group.

* * * * *